United States Patent [19]

Frenette et al.

[11] Patent Number: 4,936,021

[45] Date of Patent: Jun. 26, 1990

[54] ADJUSTABLE SUPPORT/SPACER DEVICE FOR THE CONSTRUCTION INDUSTRY

[76] Inventors: Eugene R. Frenette; Henry E. Frenette, both of P.O. Box 350, Mountain Rd., Northwood, N.H. 03261

[21] Appl. No.: 360,319

[22] Filed: Jun. 2, 1989

[51] Int. Cl.⁵ ................................................ G01B 3/30
[52] U.S. Cl. ...................................... 33/649; 269/45; 269/37
[58] Field of Search ...................... 248/542, 161, 188.5, 248/237, 231.2, 285, 286, 287, 295.1, 296, 309.1, 354.4, 413, ; 269/37, 40, 41, 43, 45; 33/646, 647, 649

[56] References Cited

U.S. PATENT DOCUMENTS

| | | | |
|---|---|---|---|
| 29,206 | 7/1860 | Vandercook | 33/647 |
| 316,338 | 4/1885 | Davis | 33/646 |
| 340,592 | 4/1886 | Montgomery | 33/646 |
| 356,166 | 1/1887 | Shanklin | 33/646 |
| 631,315 | 8/1899 | Meskill | 33/647 |
| 774,114 | 11/1904 | Spear | 33/646 |
| 977,715 | 12/1910 | Dougherty | 33/646 |
| 1,115,202 | 10/1914 | Ingles | 33/646 |
| 1,671,322 | 5/1928 | Smith | 33/646 |
| 2,006,443 | 7/1935 | Craven | 33/646 |
| 3,776,539 | 12/1973 | Curtis | 269/45 |
| 4,155,175 | 5/1979 | Stiles | 33/646 |

Primary Examiner—Blair M. Johnson
Assistant Examiner—Robert A. Olson
Attorney, Agent, or Firm—Davis, Bujold & Streck

[57] ABSTRACT

The invention relates to the an adjustable support and spacer device having and a base member and extension member which is adjustable relative thereto via a releasable clamp. The extension member and the base member each carry a support member whereby the adjustment of the extension member relative to the base member provides a relative adjustment of the two support members. The base and extension members are provided with measuring indicia and the extension member is able to be pivoted about the releasable connection device to provide angular adjustment between the two support members.

18 Claims, 2 Drawing Sheets

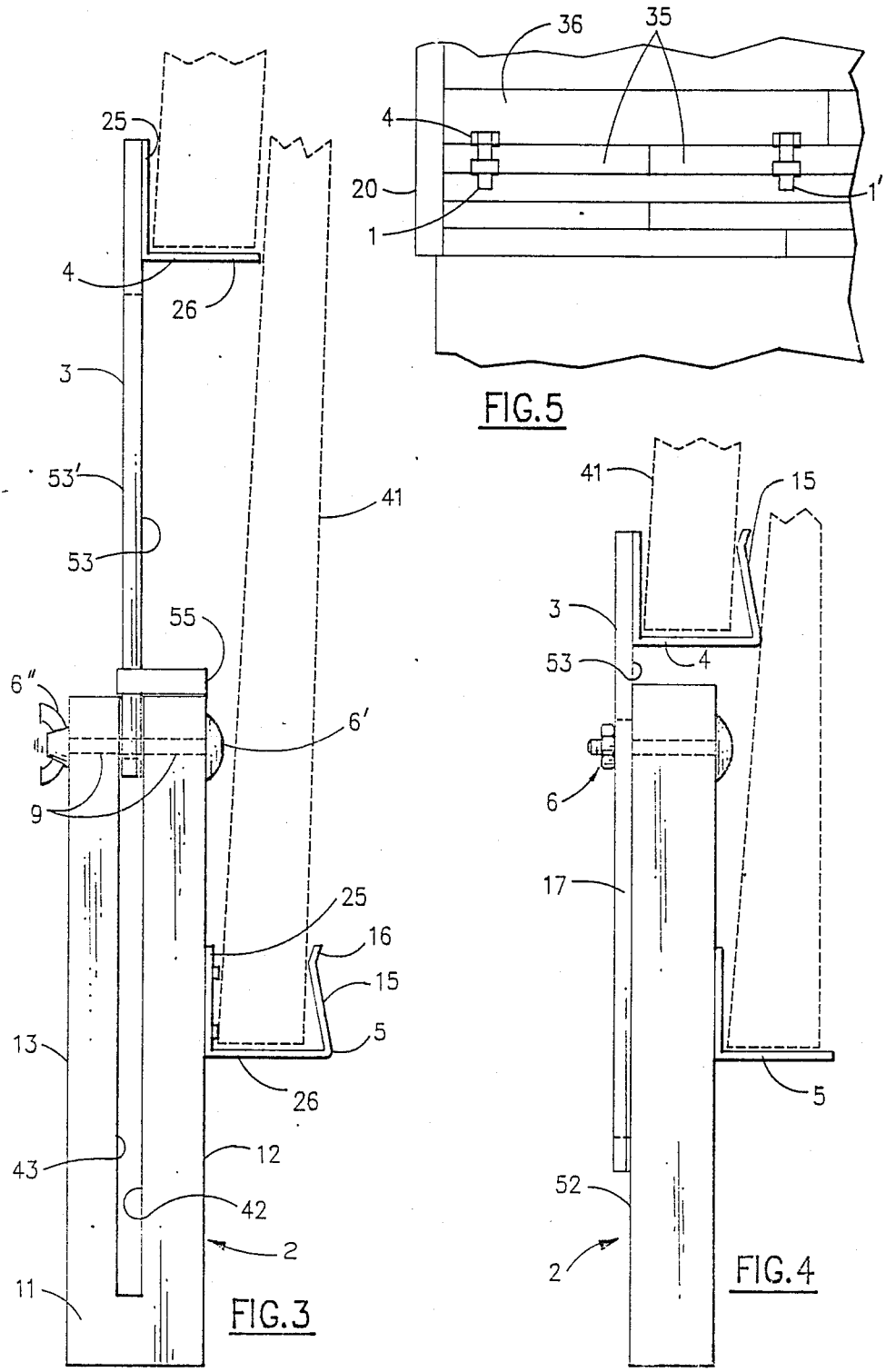

ADJUSTABLE SUPPORT/SPACER DEVICE FOR THE CONSTRUCTION INDUSTRY

The present invention relates to an adjustable support/spacer device which is particularly useful in the construction industry when it is necessary to achieve the support and uniform spacing between adjacent lengths of materials, such as when applying clapboard to the side of the house or shingles to the roof of a house.

BRIEF DISCUSSION OF THE PRIOR ART

One prior art technique for maintaining equal spacing between adjacent rows of material is to mark the desired spacing on the opposite ends of the area being worked and then to "snap" a chalk line to indicate the straight line to be followed when applying the material. A second prior art technique is to prepare a "jig" from a piece of scrap material, having two or more notches therein to indicate the desired spacing between the adjacent rows of material. Such a device can then be used to achieve the required material spacing.

Both of the above prior art techniques have their associated drawbacks in that they are both time consuming and somewhat awkward to use. In addition, the accuracy of these techniques is sometimes compromised due to alignment errors.

SUMMARY OF THE INVENTION

Accordingly, a primary object of the invention is to provide a spacer device which is readily adjustable within a desired range of movement and is quick and easy to use.

A further object of the invention is to provide a lightweight device which can be used to provide angular adjustment of the extension member relative to the base member when a "fanning" effect of the materials to be applied is desired.

Another object of the invention is to provide a device which is self-clamping to the material being applied so that the labor requirements for applying such material to a surface is minimized.

A still further object of the invention is to provide a device which is simple to operate and is relatively inexpensive to manufacture while still providing the adjustability and versatility required in the construction industry.

Briefly, the present invention comprises an adjustable support/spacer device for facilitating desired spacing between two adjacent members comprising a first member having releasable clamp means and first support means connected thereto, a second member having first and second ends with second support means connected adjacent said first end, said second member having an elongate slot extending from adjacent said second support means towards said second end, wherein said second member is engaged by said releasable clamp means which passes through said slot to provide captive lockable adjustment of the relative spacing between said first and second support means.

Alternatively, the invention comprises an adjustable support device for achieving desired spacing between two adjacent members comprising an elongate base member having first and second ends with releasable clamp means connected to said base member adjacent said first end thereof and a first support member connected to said base member at a location intermediate said ends, an elongate extension member having first and second ends with a second support member connected to said first end thereof said extension member having an elongate slot extending form adjacent said second support member towards said second and, said second member being engaged by said releasable clamp means which passes through said slot whereby relative spacing of said first and second support members can be adjusted.

DESCRIPTION OF THE DRAWINGS:

The above and other objects of the invention will be further understood by having reference to the accompanying drawings which illustrate, by way of example, a preferred embodiment of the invention, it being understood that other embodiments employing the same principles may be made as will be readily apparent to those skilled in the art.

In the drawings:

FIG. 3 is a left side elevational view of the adjustable spacer device shown in FIG. 1, with two clapboards shown in dashed lines;

FIG. 4 is a left side elevational view of a second embodiment of the adjustable spacer device of the present invention with two clapboard shown by dashed lines; and FIG. 5 is a front elevational view showing use of the adjustable spacer device for applying clapboards to the side of a house.

Turning now to FIGS. 1 through 3, the preferred embodiment of the adjustable support/spacer device 1 of the present invention will now be described in detail. It consists of an elongate base member 2 which is typically a U-shaped member, see FIG. 3, having two parallel, elongate legs 12, 13 connected together at one end by base 11. A first L-shaped support member 5 is connected to a front surface of the base member 2 at a position intermediate its ends. An opening 9, extending completely through both legs 12, 13 of the base member 2, is provided adjacent the end opposite the base 11 for accommodating a releasable clamp means 6, such as a bolt and wing-nut arrangement 6', 6". The slot formed between the parallel elongate legs 12, 13 of the base member 2 allows an extension member 3 to be adjustably received therein. The inwardly facing surfaces 42, 43 of the respective legs 12, 13 are planar to accommodate the sliding movement of the extension member relative to the base member. The thickness of leg 12 is preferably as thick as the member being applied to the surface.

Figure 1:
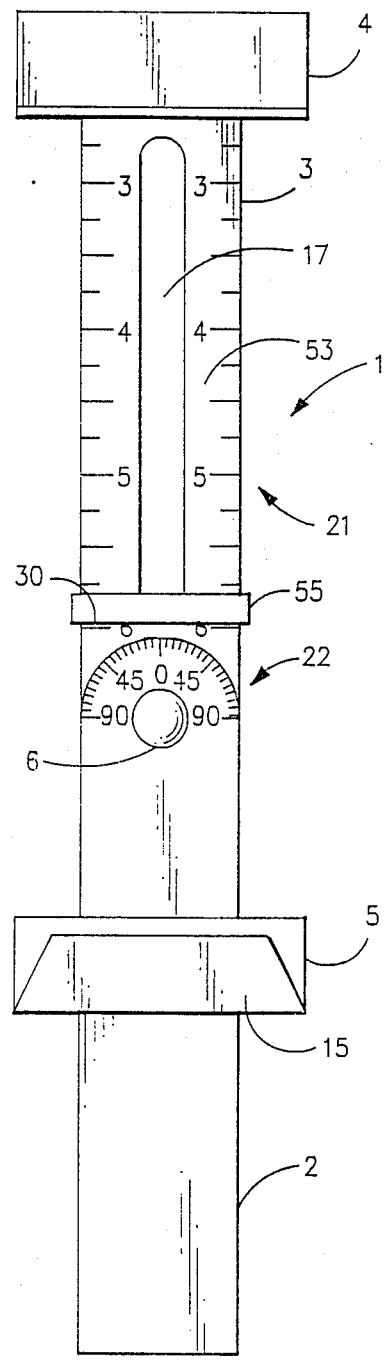
FIG. 1 is a front elevational view of the adjustable support/spacer device of the present invention shown in an extended position.

The extension member 3 comprises a elongate member having two planar surfaces 53, 53' with a second L-shaped support member 4 connected to one of the planar surfaces 53 adjacent an end of the extension member 3. An elongate slot 17, extending between the opposite ends of the extension member 3, engages with the releasable clamp means 6 to provide the necessary lockable adjustment between the first support member 5 carried by the base member 2 and the second support member 4 carried by the extension member 3.

The extension member 3 is provided with measuring indicia 21 in inches, centimeters and the like, including fractions or decimal parts thereof, along one of its planar surfaces 53, to indicate the relative spacing between the first and second support members 4, 5. An indicating surface 30 is provided adjacent the end of the base member 2 carrying the releasable connection means 6 for indicating the relative distance between the two support members 4, 5. In addition, the base member 2 is provided with angular indicia 22 and the extension member 3 carries a slidable/adjustable indicator 55 which indicates the angular position of the extension member 3 relative to the base member 2. Such an angular indication is useful for applying clapboards on the side of a house to achieve a "fanning" effect.

Figure 2:
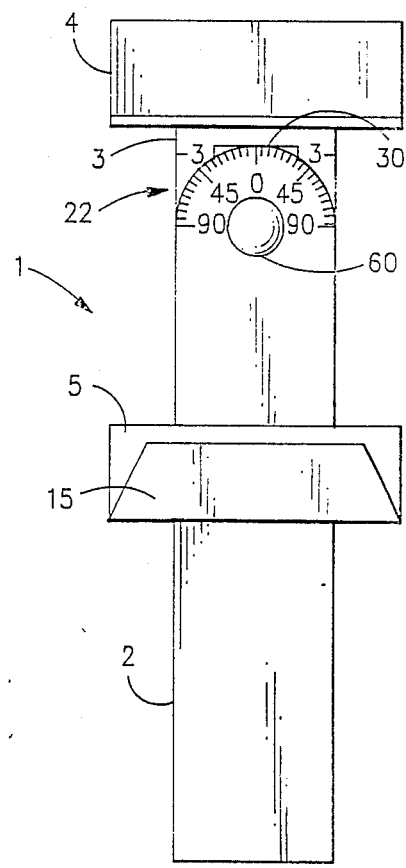
FIG. 2 is a front elevational view of the adjustable spacer device of FIG. 1 shown in a retracted position.

FIG. 4 shows a second embodiment which is very similar to that shown in FIGS. 1 through 3 except that the base member 2 is a elongate planar member, instead of a U-shaped member, having a rear planar surface 52 for engagement with front planar surface 53 of the extension member 3. This spacer device functions identically to that shown in FIGS. 1 through 3.

The support members 4 and 5 are shown in the drawings as being L-shaped members which consist of an attachment leg 25 and a base 26. In FIGS. 1-3, the first support member 5 is additionally provided with a resilient clip portion 15 so that the support member can clamp the material being applied to a surface, such as clapboard 41 shown in dashed lines in FIGS. 3 and 4. The clip portion 15 further includes a bevelled edge 16 which allows the shingle or clapboard to be easily received and securely clamped by the support member 5. The overall dimensions of the support member 5 are chosen such that when a clapboard or shingle is received thereby, it is tightly but releasably clamped by the support member so that the desired support is achieved.

Having described the device in detail, reference will now be had to FIG. 5 wherein one application of the adjustable support device 1 is shown for applying clapboards to the side of a house 20. The first support member 5, containing the clip portion, is attached to the bottom edge of the last nailed clapboard 35 and the device 1 is positioned so that the bottom of the clapboard 35' abuts against the base 26 of the support member 5, as can be seen in FIGS. 3 and 4. Next, the clapboard 36 to be nailed to the house is positioned on support member 4 and supported thereby until it is nailed to the house. With the left end of the clapboard 36 (viewing FIG. 5) being supported by the adjustable supporting device 1, the person applying the clapboards to the house is then free to move to the other (right) end of the clapboard and by using a second adjustable support device 1'0 that person is able to quickly locate and nail the clapboard at the desired location. This second supporting device 1' may or may not have a clip portion on the first support member. Thereafter, the end of the clapboard supported by the first support can then be nailed. After the clapboard 36 has been sufficiently nailed, the adjustable support device 1 can be pulled down and removed from the clapboard 35 and thereafter support member 5 can be clamped to clapboard 36 so that another clapboard can be applied to the house by repeating the above process.

It is understood that the respective first and second support members 4 and 5, shown in FIGS. 1 through 3 of the drawings, could be switched so that extension member 3 carriers the support member having the clip portion 15 while the base member carries the L-shaped support member, as can be seen in FIG. 4. This arrangement would be useful when applying material, such as clapboards, to a side of the house working from the top to the bottom in a downward fashion. To make the support members interchangeable, it is anticipated that the support members 4, 5 could be releasably connected to their respective members by slot means or other known releasable fastening means, such as screws.

Since certain changes may be made in the above adjustable support device without departing from the spirit and scope of the invention herein involved, it is intended that all subject matter contained in the above description and shown in the accompanying drawings shall be interpreted in an illustrative and not in the limiting sense.

Wherefore, I claim:

1. An adjustable support device, for achieving desired spacing between two adjacent materials to be applied to a structure, comprising:
   (a) an elongate base member having first and second ends with releasable clamp means, defining an axis, connected to said base member adjacent said first end thereof and a first support member connected to one side of said base member at a location intermediate said ends; and
   (b) an elongate extension member having first and second ends with a second support member connected adjacent said first end thereof, said extension member having an elongate slot extending from adjacent said second support member towards said second end, said extension member being releasably engaged by said releasable clamp means which passes through said slot whereby relative spacing between said first and second support members can be adjusted;
   wherein said elongate base member and said elongate extension member are pivotable with respect to one another about the axis of said clamping means, when fanning of the material to be applied is desired, and said elongate base member carries indicia adjacent said first end thereof and said elongate extension member has slidable indicating means, cooperating with said indicia, for indicating angular position of said elongate extension member relative to said elongate base member.

2. An adjustable support device according to claim 1, wherein said base member has a planar surface located adjacent said extension member.

3. An adjustable support device according to claim 1, wherein at least one of said extension member and said base member is provided with indicia indicating the relative distance between said first and second members.

4. An adjustable support device according to claim 1, wherein said first and second support members are L-shaped support members.

5. An adjustable support device according to claim 4, wherein said first support member is additionally provided with means for clamping a material to be applied to a surface.

6. An adjustable support device according to claim 5, wherein said means for clamping is a resilient clip portion extending from a base of the support member.

7. An adjustable support device according to claim 4, wherein said second support member is additionally provided with means for clamping a material to be applied to a surface.

8. An adjustable support device according to claim 7, wherein said means for clamping is a resilient clip portion extending from a base of the support member.

9. An adjustable support device according to claim 1, wherein said base member is a U-shaped member having a slot therein for adjustably receiving said extension member.

10. An adjustable support device according to claim 9, wherein said U-shaped member comprises a pair of legs connected together by a base, the legs having inwardly facing parallel surfaces to provide sliding guidance for said extension member.

11. An adjustable support device according to claim 10, wherein said extension member has at least one planar surface.

12. An adjustable support device according to claim 10, wherein said extension member has opposed parallel planar surfaces for engagement with said inwardly facing parallel surfaces.

13. An adjustable support device according to claim 12, wherein said first and second support members are L-shaped support members.

14. An adjustable support device according to claim 13, wherein said first support member is additionally provided with means for clamping a material to be applied to a surface.

15. An adjustable support device according to claim 14, wherein said means for clamping is a resilient clip portion extending from a base of the support member.

16. An adjustable support device according to claim 13, wherein said second support member is additionally provided with means for clamping a material to be applied to a surface.

17. An adjustable support device according to claim 16, wherein said means for clamping is a resilient clip portion extending from a base of the support member.

18. An adjustable support device, for achieving desired spacing between two adjacent materials to be applied to a structure, comprising:
   (a) a first member having first and second ends with releasable clamp means defining an axis connected to said first member adjacent said first end thereof and a first support carried by said first member and extending outwardly therefrom; and
   (b) a second member having first and second ends with a second support extending outwardly therefrom and connected adjacent said first end thereof, said second member having an elongate slot extending from adjacent said second support towards said second end, said second member being engaged by said releasable clamp means via said elongate slot whereby relative spacing between said first and second supports can be adjusted;
   wherein said first member and said second member are pivotable with respect to one another about the axis of said clamping means and said first member has indicia adjacent said first end thereof and said second member has indicating means cooperating with said angular indicia for indicating angular position of said first member relative to said second member.

* * * * *